United States Patent Office 2,830,959
Patented Apr. 15, 1958

2,830,959
CATALYST COMPOSITIONS

Carl B. Linn, Riverside, Ill., assignor to Universal Oil Products Company, Des Plaines, Ill., a corporation of Delaware No Drawing. Application April 27, 1955
Serial No. 504,382

4 Claims. (Cl. 252—433)

This invention relates to novel compositions of matter and more particularly to novel catalyst compositions which are of especial utility in catalyzing reactions of organic compounds and particularly of hydrocarbons.

While the composition of the present invention includes hydrogen fluoride, the composition possesses catalytic properties superior to those of hydrogen fluoride. The superior properties apparently result from a peculiar association of the hydrogen fluoride and the other components of the composition. It will be seen from the examples appended to the present specification that the composition of the present invention is a different catalyst than is hydrogen fluoride alone and as another important distinction the products formed in reactions catalyzed by the composition are different from those obtained in the presence of hydrogen fluoride. These same differences may also prevail in comparison with catalysts comprising mixtures of hydrogen fluoride and boron trifluoride.

In one embodiment, the present invention relates to a novel composition comprising hydrogen fluoride and complex of boron trifluoride and iron group metal fluoride.

In a specific embodiment, the present invention relates to a catalyst composition comprising a solution in hydrogen fluoride of a complex of boron trifluoride and iron fluoride.

In another specific embodiment, the present invention relates to a catalyst composition comprising hydrogen fluoride and a solid composite of a complex of boron trifluoride and ferrous fluoride with a solid support.

As hereinbefore set forth, the novel composition includes a complex of boron trifluoride and an iron group metal fluoride. The metal fluoride preferably comprises iron fluoride. Other metal fluorides included within the scope of the present invention are cobalt fluoride and nickel fluoride but not necessarily with equivalent results. In general, the metal fluorides in the low valence state appear to be more effective and are preferred. This includes particularly ferrous fluoride. Similarly, cobaltous fluoride and nickelous fluoride are more effective.

The preferred catalyst composition comprises hydrogen fluoride and a complex of boron trifluoride and ferrous fluoride. This composition analyzes as $FeF_5B$ and is believed to be of the formula $FeF_2 \cdot BF_3$. However, it is understood that applicant does not intend to limit himself to this specific explanation and that the composition also may include complexes containing two and possibly more $BF_3$ constituents complexed with ferrous fluoride. Also, it is possible that one $BF_3$ constituent may be complexed with two or even more metal fluoride constituents, thus effecting the necessary association of these components in order to produce the active catalytic properties. Because of the theoretical formula hereinbefore set forth, and because of the method in which the complex is prepared, as well as the stability of boron trifluoride, it is believed that the boron trifluoride constituent is present as such in the complex and does not become disassociated.

The complex of boron trifluoride and ferrous fluoride is a non-fuming white solid and is stable at ordinary temperature and pressure. However, it loses boron trifluoride when heated, gradually at first and substantially at 50° C. at atmospheric pressure. Therefore, the complex should not be heated to high temperature at atmospheric pressure. However, when it is desired to heat the catalyst or to conduct reactions at elevated temperatures, the heating and reaction should be effected under sufficient pressure to preclude a loss of boron trifluoride.

The complex may be formed in any suitable manner. In one method, hydrogen fluoride is reacted with iron to form ferrous fluoride and the latter then is reacted with boron trifluoride to form the complex. In another method, hydrogen fluoride and boron trifluoride are contacted simultaneously with iron. In preparing the complex, it apparently is necessary that an environment of hydrogen fluoride be present during the addition of boron trifluoride. Therefore, when the hydrogen fluoride is added first and then the boron trifluoride, sufficeint hydrogen fluoride should be present in the system in order to effect the formation of the desired complex. The iron preferably is in a finely divided state and conveniently comprises iron powder. The reaction is exothermic and yields one mole of hydrogen for each gram atom of iron. It will be noted that the preferred reaction entails two moles of hydrogen fluoride and one mole each of iron and boron trifluoride.

The complex as formed in the above manner may be utilized either as a liquid solution or as a solid mass. When utilized as a liquid, the complex preferably is prepared as a solution in anhydrous hydrogen fluoride. Generally an excess of hydrogen fluoride will be utilized in forming the solution. However, the complex is soluble in hydrogen fluoride only to a small extent, and thus an excess of hydrogen fluoride is inherently obtained. An excess of solid complex may be employed and the catalyst, in this embodiment, will comprise a mixture of liquid and solid phases. When utilized as a solid mass, the complex may be disposed as a fixed bed in a reaction zone and the hydrogen fluoride is introduced into the reaction zone in any suitable manner. In any event, it is understood that the hydrogen fluoride may be utilized as a liquid and/or gas in preparing the complex or during the processing operation.

In another embodiment in which the complex is utilized as a solid mass, the complex is prepared as a composite with a suitable supporting material. The supporting material preferably is not reactive with hydrogen fluoride and is porous. A particularly preferred support comprises activated charcoal. Other supporting materials may comprise certain metal fluorides including, for example, aluminum fluoride, calcium fluoride, magnesium fluoride, strontium fluoride, barium fluoride, etc. The composite of complex and support may be prepared in any suitable manner.

It is understood that the support may comprise other metal fluorides which will not be dissolved, removed or otherwise adversely affected upon contact with hydrogen halide, and particularly hydrogen fluoride, utilized as a component of the catalyst. Similarly, the other halides, including chloride, bromide and/or iodide, of the metals specifically set forth above or of other metals may be utilized providing they meet the requirements hereinbefore set forth. Furthermore, metal oxides or other metal compounds may be employed provided they will retain satisfactory physical properties during use. In some cases, the metal oxide or other metal compound may in part react with the hydrogen halide but will retain its physical properties to provide a suitable supporting material. It is understood that the various supports are not necessarily equivalent and that the particular support to be used will be selected with regard to the specific complex and hydrogen halide utilized as the catalyst. Here again, the composite of complex and support may be prepared in any suitable manner.

While the specific illustrations hereinbefore set forth are directed to the complex of iron fluoride and boron trifluoride, it is understood that the complex of cobalt fluoride with boron trifluoride and nickel fluoride with boron trifluoride may be employed but not necessarily with equivalent results. The complex containing cobalt and the complex containing nickel may be prepared in substantially the same manner as described in connection with the preparation of the complex containing iron. Similarly, while the preferred complex of the present invention contains fluorine as the halogen, it is understood that is certain cases, the complex may contain one or more of the other halogens, namely, chlorine, bromine and iodine, but not necessarily with equivalent results. Furthermore, it is understood that suitable modifications will be made when necessary in preparing these other complexes. In some cases, the complex may contain two or more metals, particularly of the iron group, and/or two or more halogens.

While hydrogen fluoride generally is preferred, it is understood that other hydrogen halides, including hydrogen chloride, hydrogen bromide and hydrogen iodide or mixtures thereof, or mixtures thereof with hydrogen fluoride may be employed. Furthermore, it is understood that certain halogen containing compounds and particularly alkyl halides, including alkyl fluorides, alkyl chlorides, alkyl bromides and alkyl iodides may be utilized in place of or along with the hydrogen halide. Specific alkyl halides include ethyl fluoride, propyl fluoride, butyl fluoride, amyl fluoride, hexyl fluoride, etc., ethyl chloride, propyl chloride, butyl chloride, amyl chloride, hexyl chloride, etc., ethyl iodide, propyl iodide, butyl iodide, amyl iodide, hexyl iodide, etc., ethyl bromide, propyl bromide, butyl bromide, amyl bromide, hexyl bromide, etc., or mixtures thereof. It is understood that polyhalo-alkane compounds, halo-cyclic compounds and/or polyhalo-cyclic compounds may be utilized in some cases. Furthermore, it is understood that these various modifications are not necessarily equivalent and that suitable modification in operation may be necessary to accommodate these changes.

As hereinbefore set forth, a novel composition of the present invention comprises hydrogen fluoride and the complex. As will be illustrated in the following example, the complex alone is not a catalyst for certain reactions and it is only the combination of hydrogen fluoride and the complex which serves to catalyze these reactions. The proportions of hydrogen fluoride and complex may vary over a wide range as, for example, from 0.01:1 or less to 200:1 or more and preferably from 0.5:1 to 150:1 molar proportions of hydrogen fluoride per molar proportion of complex. The specific proportions generally will depend upon the particular reaction being catalyzed and whether the complex is utilized as a solution in hydrogen fluoride or as a solid mass.

The catalyst composition of the present invention may be utilized for effecting various reactions of organic compounds and particularly of hydrocarbons. These reactions include (A) condensation reactions in which two molecules, which may be the same or different, are condensed to form a larger size molecule, (B) destructive reactions in which a molecule is decomposed into a smaller size molecule or into two or more molecules, (C) rearrangement reactions as, for example, isomerization, (D) disproportionation reactions in which a radical is transferred from one molecule to another molecule etc., (E) hydrogenation reactions, and (F) other reactions. Among these reactions are (1) polymerization of olefins and particularly of ethylene, propylene, butylene, amylene, and higher boiling olefins or mixtures thereof, (2) alkylation of isoparaffins with olefins or other alkylating agents including, for example, alkyl halide, etc., and particularly the alkylation of isobutane, isopentane, and/or isohexane with ethylene, propylene, butylene, amylene, etc., or mixtures thereof, (3) alkylation of aromatics with olefins or other alkylating agents, and particularly the alkylation of benzene, toluene, etc., with propylene, butylene, amylene, and higher boiling olefins, particularly nonene, decene, undecene, dodecene, tridecene, tetradecene, pentadecene, etc., or mixtures thereof, (4) isomerization of paraffins and particularly of n-butane, n-pentane, n-hexane, n-heptane, n-octane, etc., or mixtures thereof, (5) isomerization of naphthenes as, for example, the isomerization of methyl cyclopentane to cyclohexane, isomerization of dimethylcyclopentane to methylcyclohexane, etc., (6) alkylation of phenols or thiophenols with olefins or other alkylating agents, (7) alkylation of thiophenes with olefines, (8) hydrogen transfer reactions, (9) alkyl transfer reactions, (10) dealkylation reactions, (11) dehydrogenation of saturated hydrocarbons including paraffins, naphthenes, etc., to form unsaturated compounds including olefins, cycloolefins, etc., or the dehydrogenation of the unsaturated compounds to form more highly unsaturated compounds as, diolefins, cyclodiolefins, aromatics, etc., (12) reforming of gasoline or naphtha to improve the antiknock characteristics thereof, (13) destructive hydrogenation reactions, (14) cracking of oil heavier than gasoline into lower boiling products and particularly gasoline, (15) hydrogenation reactions in which an unsaturated compound is hydrogenated to a more saturated compound as, for example, the hydrogenation of diolefins to olefins, olefins to paraffins, cycloolefins to naphthenes, etc., (16) reductive alkylation reactions as, for example, the reductive alkylation of an amino compound and particularly an aromatic amino compound, including aniline, phenylene diamine, naphthyl amine, etc., with a ketone, aldehyde, etc., in order to replace one or more of the hydrogens attached to the nitrogen atom or atoms with a hydrocarbon substituent, and (17) other reactions of hydrocarbons or other organic compounds. The operating conditions to be employed will depend upon the particular reaction and generally will be at ambient temperature, although elevated temperature may be employed, particularly with superatmospheric pressure. In some reactions it may be preferred to utilize subatmospherice temperature. Thus, the temperature may range from −50° C. or less to 300° C. or more, preferably 10° to 150° C., and the pressure may range from atmospheric to 5000 pounds or more, preferably atmospheric to 200 pounds. Hydrogen may be employed when required or of advantage.

The process may be effected in any suitable manner, which will depend upon the particular reaction and the form in which the catalyst is used. When the catalyst is used as a solution, a convenient method is to pass the reactant or reactants and catalyst through suitable mixing means and thereby effect intimate contact between the reactants and catalyst. In one method, this may be accomplished by utilizing a reaction zone equipped with suitable agitating means. In another method, the mixture of reactant or reactants and catalyst may be passed through orifice mixers, etc., and then through suitable time tanks to effect the desired contacting. Other well-known means may be utilized to effect the desired contacting of the reactants and catalyst.

When the complex is used as a solid mass, it may be disposed as a fixed bed in a reaction zone, and the reactants and hydrogen fluoride are supplied thereto in any suitable manner. The reactants may be passed either in upward or downward flow through the catalyst bed. In one method, hydrogen fluoride may be commingled with all or a portion of one of the reactants and the mixture supplied to the reaction zone. In this embodiment, a convenient method is to pass all or a portion of the reactant or, in case two reactants are employed, to pass all or a portion of one of the reactants, usually the less reactive material, continuously or intermittently through a body or pool of liquid hydrogen fluoride, and the reactant saturated with hydrogen fluoride is then introduced into the reaction zone. When desired, the hydrogen fluoride may be supplied separately to the reaction zone and passed concurrently or countercurrently to the reactants. In still another embodiment, the hydrogen fluoride may be introduced at a mid-point in the reaction zone or, when desired, the hydrogen fluoride may be introduced at either the upper or lower portion of the reaction zone and the reactants introduced at a mid-point in the reaction zone.

The hydrogen fluoride may be introduced continuously or intermittently as desired. In some cases, the hydrogen fluoride may be introduced initially in the operation and the flow of hydrogen fluoride discontinued during part or all of the remainder of the operation. Apparently, sufficient hydrogen fluoride is retained in the reaction zone, possibly in a chemical or physical association with the complex, to produce the desired catalytic effect. Also, in some cases, boron trifluoride may be introduced into the reaction zone during the conversion process, either continuously or intermittently, especially in operations where boron trifluoride may be evolved and removed with the effluent products from the reaction zone.

Regardless of the particular operation employed, the products are fractionated or otherwise separated to recover the desired product, and to separate unconverted material for recycling. Hydrogen fluoride in the effluent product likewise is separated and preferably is recycled. When boron trifluoride is present in the effluent product, it may be separated and either recycled to the reaction zone or reused in preparing additional complex.

The following examples are introduced to illustrate further the novelty and utility of the present invention but not with the intention of unduly limiting the same.

EXAMPLE I

A complex was prepared by the general method of placing 28 grams of iron powder and 88 grams of anhydrous hydrogen fluoride in a copper lined steel autoclave. The autoclave was heated to about 100° C. and rotated for about ½ hour, following which it was allowed to cool and the hydrogen released. 61 grams of boron trifluoride were then pressured in, followed by rotating the autoclave for 20 hours at 23° C. 82 grams of complex were recovered as a while solid. The analysis of the complex is as follows: Calculated for $FeF_2 \cdot BF_3$: 34.6% iron, 58.7% fluorine and 7.6% boron. The complex analyzed 34.5% iron, 45.9% fluorine and 7.6% boron. It will be noted that there is some discrepancy in the fluorine determination, but this is due to the difficulties in the analysis of fluorine in the presence of boron.

A mixture of hydrogen fluoride and the complex prepared in the above manner was utilized in an anhydrous and oxygen-free system for the alkylation of isobutane with propylene at −40° C. This run was effected in a one liter turbomixer cooled in a Dry Ice bath to −40° C. 25 grams of the complex were sealed into the turbomixer and 220 grams of liquid hydrogen fluoride were charged thereto. A liquid mixture of isobutane-propylene (244 grams isobutane, 5 grams propane and 51 grams propylene) was added during a 1.5 hour period. After contact for an additional 0.5 hour at −40° C., the turbomixer contents were collected and analyzed as follows: The contents were pressured into a copper flask containing water and ice. The non-condensible gases were passed through a train of soda lime, Dry Ice traps and a wet test meter. The liquid remaining in the flask was warmed to 30° C. and the condensible gases thus liberated were collected, combined with the condensible gases collected in the Dry Ice traps, and distilled in a low temperature Podbielniak column and analyzed in a mass spectrometer. The liquid in the flask was washed, dried, distilled and analyzed by infrared spectroscopy.

In the reaction described above, 107 grams of hydrocarbons boiling above isobutane were produced, which calculates as a yield of 210%, the yield being determined as: $100 \times$ grams $C_5+$/grams $C_3H_6$. The composition of hydrocarbon product is as follows:

Table I

| Compound: | Percent by weight |
|---|---|
| Isopentane | 6.2 |
| n-Pentane | 0.3 |
| 2,3-dimethylbutane | 5.2 |
| Methylpentane | 0.7 |
| 2,4-dimethylpentane | 4.1 |
| 2,3-dimethylpentane | 24.6 |
| 2,2,4-trimethylpentane | 17.9 |
| Other trimethylpentanes | 4.0 |

In addition, some higher boiling material was collected, as well as a minor amount of other products which were not identified.

In contrast, a run made under substantially the same conditions but using hydrogen fluoride alone as the intended catalyst resulted in virtually no alkylation of isobutane by propylene, which latter compound was converted into a mixture of polymer and alkyl fluorides.

From the above data, it will be observed that the mixture of hydrogen fluoride and complex was an active alkylation catalyst under the conditions employed. On the other hand, hydrogen fluoride alone was not effective to catalyze the alkylation reaction at these conditions.

EXAMPLE II

The comparison described in Example I was made at a temperature of −40° C. The comparison of this example was made in runs conducted at an initial temperature of about 29° C. In both of the runs reported in this example, the reactants comprised approximately 78 grams of ethylene and 224 grams of an isobutane fraction containing 6 grams n-butane. The runs were affected in an anhydrous and oxygen-free system utilizing a rotating autoclave by first introducing the catalyst and isobutane and then charging ethylene over a period of 2 minutes at an initial temperature of about 29° C., after which the mixture was stirred for 18 hours at 35° C. In the run using hydrogen fluoride alone, the catalyst comprised 204 grams of hydrogen fluoride. In the run using the mixed catalyst, 202 grams of hydrogen fluoride and 20 grams of the complex prepared in the manner described in Example I were utilized.

In the run using hydrogen fluoride alone, 84 grams of material boiling above isobutane were recovered. On the other hand, in the run utilizing hydrogen fluoride and the complex as catalyst, 197 grams of material boiling above isobutane was recovered.

The products were analyzed substantially in the manner described in Example I, and the pertinent analyses are shown in the following table:

Table II

| Product | Grams | |
|---|---|---|
| | Mixed Catalyst | HF |
| ethyl fluoride | 14 | 65 |
| isobutane | 66 | 157 |
| n-butane | 12 | |
| isopentane | 52 | 13 |
| n-pentane | 6 | 0 |
| 2,2-dimethylbutane | 9 | 0 |
| 2,3-dimethylbutane | 9 | 28 |
| 2-methylpentane | 22 | 5 |
| 3-methylpentane | 9 | 1 |
| n-hexane | 5 | 0 |
| uncharacterized, B. P. 20–80° C | 3 | 3 |
| uncharacterized, B. P. 80–200° C | 74 | 35 |
| >200° C | 8 | 2 |

From the above table, it will be noted that more than twice as much alkylate was obtained with the catalyst composition of the present invention. Furthermore, the yield of ethyl fluoride is much less in the presence of the complex than in its absence, demonstrating that alkylation rather than hydrofluorination is the preferred reaction when utilizing the complex.

EXAMPLE III

As illustrated by Example I, hydrogen fluoride alone is not a catalyst for the alkylation of isobutane with propylene at −40° C., although it is a catalyst at 0° C. However, the products formed by alkylation utilizing hydrogen fluoride and the complex as the catalyst are different from those obtained when using hydrogen fluoride alone. Comparable runs were made in the same manner as described in Example I, except at a temperature of 0° C. In one run 225 grams of hydrogen fluoride was used as a catalyst and in another run 242 grams of hydrogen fluoride and 25 grams of complex were used as the catalyst. The products were collected and analyzed in substantially the same manner as hereinbefore set forth.

The compositions of the $C_5+$ products from both of these runs are given in the following table:

*Table III*

| Product | Weight Percent | |
|---|---|---|
| | Mixed Catalyst | HF |
| isopentane | 38.3 | 6.5 |
| 2,3-dimethylbutane | 3.2 | 1.6 |
| 2-methylpentane | 5.4 | 0.2 |
| 2,4-dimethylpentane | 4.4 | 2.8 |
| 2,3-dimethylpentane | 1.9 | 55.4 |
| 2,2,3-trimethylbutane | 0.3 | 0.1 |
| methylhexane | 5.2 | 0 |
| 2,2,4-trimethylpentane | 1.3 | 13.5 |
| other trimethylpentanes | | 3.4 |
| dimethylhexane | 5.6 | 0.7 |
| methylheptane | 0.9 | 0 |
| 2,2,5-trimethylhexane | | 0.2 |
| $C_{11}$ | 2.0 | 6.0 |
| Yield | 227 | 213 |

From the above data it will be noted that the products formed when using the mixture of hydrogen fluoride and complex are different from those obtained when using hydrogen fluoride alone as the catalyst.

EXAMPLE IV

As hereinbefore set forth the complex alone is not a catalyst for the alkylation of isobutane with propylene. In a run made at 25–30° C. and using 25 grams of the complex prepared in the manner described in Example I but no hydrogen fluoride, 56 grams of the 58 grams of propylene charged and 211 grams of the 228 grams of isobutane charged were recovered in the effluent product. Only 7 grams of $C_5+$ material was produced. In contrast, in a comparable run but using 3 grams of hydrogen fluoride alone with the 25 grams of complex, a yield of $C_5+$ alkylate of 105 grams was obtained.

EXAMPLE V

This example illustrates a continuous alkylation run utilizing hydrogen fluoride and the complex supported on charcoal. The charge comprised isobutane and propylene. The complex was placed in a reactor. Liquid isobutane saturated with hydrogen fluoride was passed through the complex for 30 minutes at 2 hourly liquid space velocity. The isobutane was saturated with hydrogen fluoride by being passed through a pool of liquid hydrogen fluoride at 25° C. Following this, propylene along with isobutane saturated with hydrogen fluoride were charged to the reactor at a liquid hourly space velocity of 3 for slightly over 2½ hours. The introduction of hydrogen fluoride then was discontinued, and the isobutane was supplied directly to the reactor along with propylene. This run was continued for a period of slightly over 3 hours at a liquid hourly space velocity of 7. In the latter run, the yield of alkylate amounted to about 140% based upon the propylene charged. This yield does not include the $C_5+$ in the condensible gas fraction, which fraction was not analyzed.

It will be noted that alkylation was effected even after the introduction of hydrogen fluoride was discontinued. As hereinbefore set forth, apparently a sufficient concentration of hydrogen fluoride is retained in association with the complex to provide a satisfactory catalyst.

EXAMPLE VI n-Butane was isomerized in the presence of hydrogen fluoride and the complex. The charge comprised 95 grams of n-butane and the catalyst comprised 50 grams of hydrogen fluoride and 15 grams of the complex prepared in the manner described in Example I. This run was made in an anhydrous and oxygen-free system utilizing a sealed rotating autoclave and a temperature of 100° C. After 17 hours of contacting, the product contained 44 grams of isobutane, which comprises a yield of more than 46% based upon the n-butane charged.

EXAMPLE VII

This example illustrates the use of the catalyst composition for the cracking of n-pentane. The catalyst comprised 56 grams of hydrogen fluoride and 20 grams of the complex prepared in the manner described in Example I. 127 grams of n-pentane was charged to a sealed rotating autoclave and the reaction was effected at 50° C. After 72 hours of contacting, the product contained 10 grams of propane, 50 grams of isobutane and 13 grams of n-butane, thus comprising the conversion of over 55% of n-pentane to lower boiling products.

EXAMPLE VIII

A complex comprising $NiF_2 \cdot BF_3$ was prepared in substantially the same manner as described hereinbefore. 29.3 grams of nickel powder and 96 grams of hydrogen fluoride were sealed into a copper lined rotating autoclave, the autoclave was heated and rotated for 8 hours at 100° C. After cooling, the pressure was released and then 55 grams of $BF_3$ were pressured into the autoclave, and the autoclave rotated and heated at about 25° C. for 22 hours. The autoclave was cooled, the pressure released, and 81.6 grams of $NiF_2 \cdot BF_3$ complex recovered.

The complex as prepared in the above manner may be utilized, along with hydrogen fluoride, for the polymerization of butene at a temperature of 35° C.

EXAMPLE IX

A complex was prepared from cobalt powder, hydrogen fluoride and $BF_3$. 15 grams of cobalt powder, 39 grams of hydrogen fluoride and 43 grams of $BF_3$ were sealed into an autoclave and heated and rotated at 100° C. for 18 hours. 28 grams of complex were recovered.

I claim as my invention:

1. A composition of matter consisting essentially of hydrogen fluoride and a preformed complex of equimolar proportions of boron trifluoride and an iron group metal fluoride, the metal in said iron group metal fluoride being characterized by being in the valence state of two, the composition containing from about 0.01:1 to about 200:1 molar proportions of hydrogen fluoride per molar proportion of complex.

2. A composition of matter consisting essentially of hydrogen fluoride and a preformed complex of equimolar proportions of boron trifluoride and ferrous fluoride, the composition containing from about 0.01:1 to about 200:1 molar proportions of hydrogen fluoride per molar proportion of complex.

3. A composition of matter consisting essentially of hydrogen fluoride and a preformed complex of equimolar proportions of boron trifluoride and cobaltous fluoride, the composition containing from about 0.01:1 to about 200:1 molar proportions of hydrogen fluoride per molar proportion of complex.

4. A composition of matter consisting essentially of hydrogen fluoride and a preformed complex of equimolar proportions of boron trifluoride and nickelous fluoride, the composition containing from about 0.01:1 to about 200:1 molar proportions of hydrogen fluoride per molar proportion of complex.

References Cited in the file of this patent

UNITED STATES PATENTS

| | | |
|---|---|---|
| 1,933,434 | Hofmann et al. | Oct. 31, 1933 |
| 2,092,295 | Pesky et al. | Sept. 7, 1937 |
| 2,142,980 | Huijser et al. | Jan. 3, 1939 |
| 2,204,673 | Fulton et al. | June 18, 1940 |
| 2,217,019 | Ipatieff et al. | Oct. 8, 1940 |
| 2,499,515 | Lien | Mar. 7, 1950 |